United States Patent [19]

Tamba et al.

[11] Patent Number: 4,901,819
[45] Date of Patent: Feb. 20, 1990

[54] LUBRICATION DEVICE FOR VERTICAL CRANK SHAFT ENGINE

[75] Inventors: Shinichi Tamba, Kakogawa; Yoshiro Yamane, Akashi; Tetsuhiro Yamakawa, Kakogawa, all of Japan

[73] Assignee: Kawasaki Jukogyo Kabishiki Kaisha, Japan

[21] Appl. No.: 198,236

[22] Filed: May 25, 1988

[30] Foreign Application Priority Data

May 29, 1987 [JP] Japan .................. 62-136508

[51] Int. Cl.$^4$ .................. F01M 9/00; F01M 1/00
[52] U.S. Cl. .................. 184/6.18; 416/237; 184/31; 123/196 W
[58] Field of Search .................. 184/6.18, 31; 123/196 W, 196 R; 416/237; 415/88

[56] References Cited

U.S. PATENT DOCUMENTS

| | | | |
|---|---|---|---|
| 2,614,497 | 10/1952 | Cowles | 123/196 W |
| 3,580,550 | 5/1971 | Hunnicutt | 416/237 |
| 4,153,392 | 5/1979 | Elson et al. | 184/6.18 |
| 4,549,103 | 10/1985 | Shiga | 416/237 |

FOREIGN PATENT DOCUMENTS

| | | | |
|---|---|---|---|
| 831187 | 2/1952 | Fed. Rep. of Germany | 184/6.18 |
| 59-150921 | 9/1984 | Japan . | |

*Primary Examiner*—Henry A. Bennet
*Assistant Examiner*—Denise L. Ferensic

[57] ABSTRACT

A lubrication device for a vertical crank shaft engine. A portion of a crank case, which houses the crankshaft with a small clearance at a given range of the lower side of the crankshaft extending vertically and expands upwards of the housing portion, forms an oil reservoir between the crankshaft, and a pumping member fixed to the crankshaft for rotation is provided in the lower portion of the oil reservoir.

6 Claims, 3 Drawing Sheets

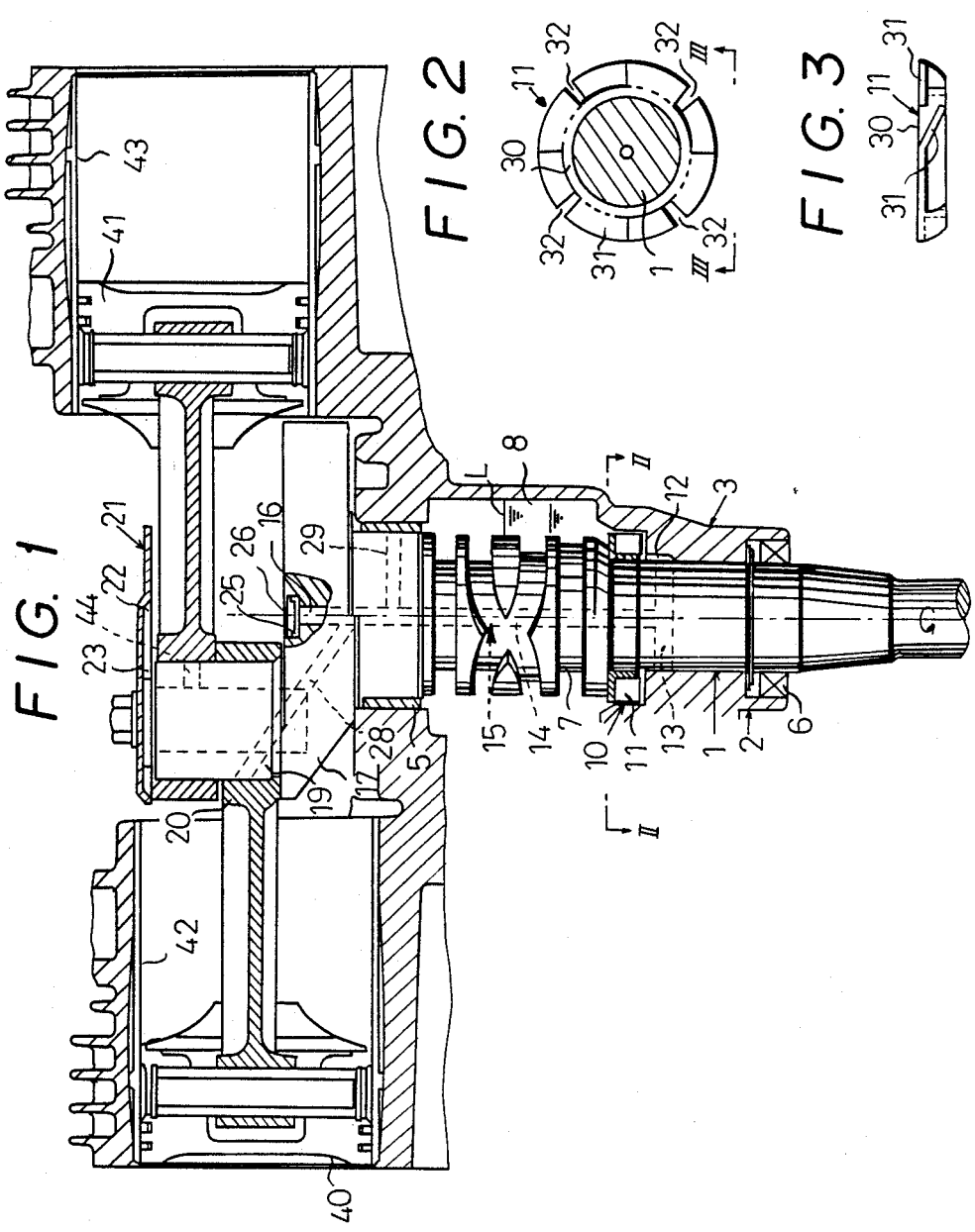

LUBRICATION DEVICE FOR VERTICAL CRANK SHAFT ENGINE

FIELD OF THE INVENTION AND RELATED ART STATEMENT

This invention relates to a lubrication device for a vertical crank shaft engine.

In the engine wherein a crankshaft is disposed so as to extend vertically, a crank web and a crank pin rotate horizontally about the vertical shaft; therefore, the use of a splash-lubrication system by a splasher provided on a connecting rod, as seen in a horizontal crank shaft engine, is impossible.

Therefore, in the construction of the conventional vertical crank shaft engine, an oil slinger is connected to a crankshaft through a gear or alternatively an oil pump is connected to a cam shaft, as shown in Japanese Utility Model Laid Open No. Sho 59-150921.

However, the aforesaid conventional structure cannot be adopted for an engine having no gear on a crankshaft or an engine having no cam shaft.

Additionally, the use of such a mechanism as the oil slinger and oil pump, which is independent of the crankshaft and disposed apart from the crankshaft, results in an increase of the weight of the whole engine as well as the production cost. An oil path extending from the oil pump connected with the cam shaft to the position to be lubricated, such as a connecting portion of a connecting rod, may be also complicated in structure.

OBJECT AND SUMMARY OF THE INVENTION

It is the object of the invention to eliminate the aforesaid problems in the prior art and provide a lubrication device for a vertical crank shaft engine resulting in a simple structure and light-weight engine.

To achieve the aforesaid object, a lubrication device for a vertical crank shaft engine according to the invention comprises an oil reservoir formed between a portion of a crank case, which houses the crankshaft with a small clearance at a given range of the lower side of the crankshaft extending vertically and expands upwards of the housing portion and the crankshaft, and a pumping member fixed to the crankshaft for rotation in the lower portion of the oil reservoir.

In addition, it is preferable that the aforesaid pumping member according to the invention is so simply constructed as to have a blade bent at a given angle axially downwards of the crankshaft between the one portion of the crank case and the crankshaft.

Furthermore, to achieve the object of the invention, it is desirable that an oil supply path for lubricating a bearing of the crankshaft, a connecting portion of a connecting member, an inner face of a cylinder, and the like is formed in the crankshaft by perforation. The provision of the oil path enables the simplification of an oil supply system. An oil reservoir is desirably provided downwards of the connecting portion of the connecting member with a piston so that returning oil from each portion to be lubricated can be easily led into the oil reservoir.

In the aforesaid construction according to the invention, as shown in the following preferred embodiments of the invention, the lubrication device for the engine comprises the oil reservoir between the crankshaft and the portion of the crank case and the pumping member fixed to the crankshaft for driving; in this manner, the whole engine can be simplified in construction and reduced in weight.

In addition, according to the invention, the oil path can be simplified in structure; especially, the provision of the oil supply path inside the crankshaft remarkably simplifies the oil path structure, thus accelerating the simplification in structure and decreasing the weight of the whole engine.

Furthermore, if the pumping member has the aforesaid desirable construction, an oil pump with simple structure and high reliability can be obtained.

BRIEF DESCRIPTION OF THE DRAWINGS

In the accompanying drawings, there are shown illustrative embodiments of the invention from which these and other of its objectives, novel features and advantages will be readily apparent.

In the drawings:

FIG. 1 is a vertical sectional schematic view of an embodiment of the invention.

FIG. 2 is a sectional partial view taken along line II—II in FIG. 1.

FIG. 3 is a view taken in the direction of the arrows along line III—III in FIG. 2.

DETAILED DESCRIPTION OF THE PREFERRED EMBODIMENTS

Figure 4:
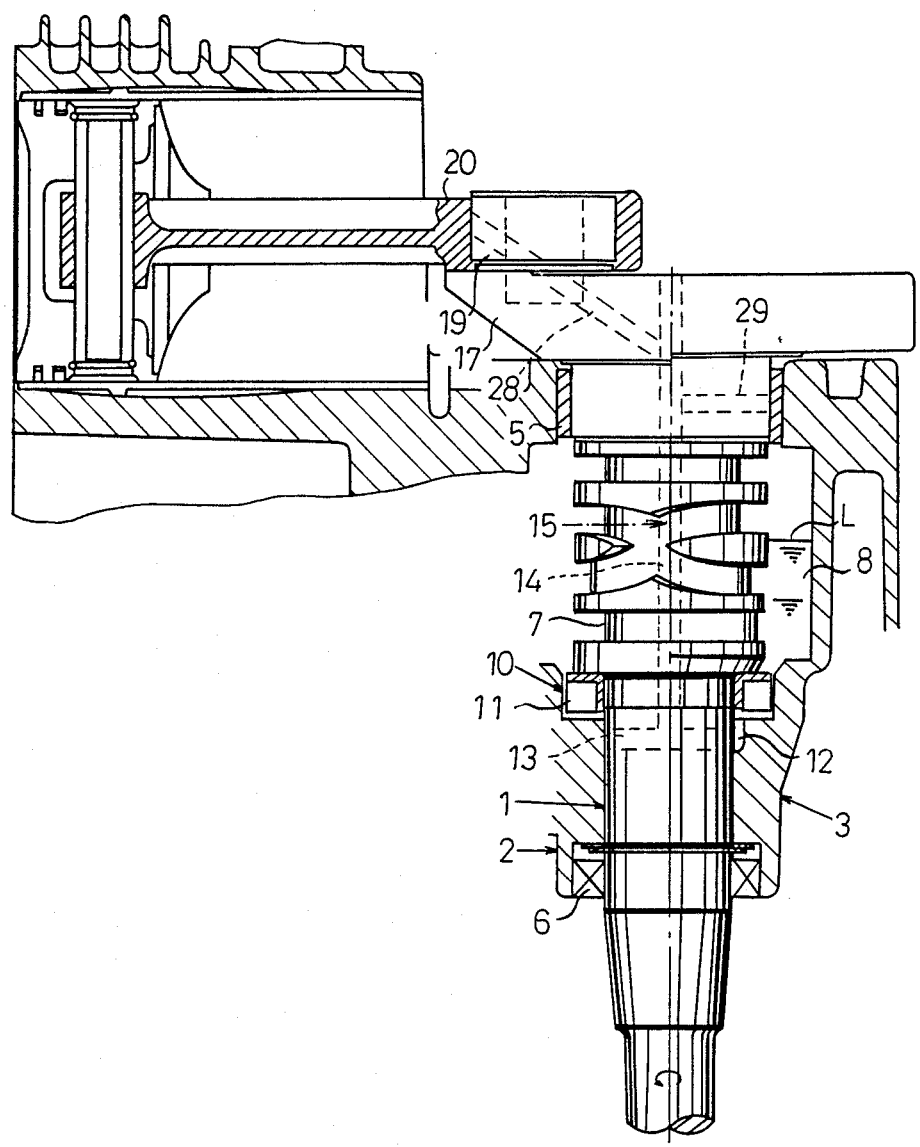
FIG. 4, 5 and 6 are vertical sectional schematic views of other embodiments.

In FIG. 1 of a vertical sectional schematic representation, a crankshaft 1 is so disposed as to extend vertically and supported by a substantially cylindrical bearing portion 3, which is an example of a portion of a crank case 2. A bearing 5 is provided between the upper end portion of the bearing portion 3 and the crankshaft 1. A cam 7 is provided on the upper half of the crankshaft 1 (in the vicinity of the lower side of the bearing 5). The cam 7 is so set as to drive a push rod (not shown).

The space between the bearing portion 3 and the crankshaft 1 is formed as an oil reservoir 8 near the cam 7. An oil is contained in the oil reservoir 8, for example, up to a level (L) higher than an oil pump 10 described below and lower than the bearing 5. The oil pump 10, serving as a member carrying out a pump action, is provided downwards of the cam 7 and near the bottom of the oil reservoir 8 so as to pressurize the oil for discharge. In the embodiment, the oil pump 10 is so constructed as to have a ring blade 11 fixed on the crankshaft 1. A discharge port 12 of the oil pump 10 is positioned downwards of the blade 11 and made of a void formed on the inner circumferential face of the bearing portion 3. The bearing portion 3 houses the crankshaft 1 at the lower side portion of the discharge port 12 with an extremely small clearance. A seal 6 is provided between the lower end portion of the bearing portion 3 and the crankshaft 1 to prevent an oil leak from the oil reservoir.

A supply path 15 connecting to the discharge port 12 is provided inside the crankshaft 1. The supply path 15 consists of an oil path 13 extending diametrically through the crankshaft 1 and connecting to the discharge port 12 and an oil path 14 extending upward from the oil path 13 through the center of the crankshaft 1. An upper end outlet 16 of the oil path 14 is opened on the upper end face of a crank web 17. In this manner, the provision of the oil path inside the crankshaft 1 can simplify an oil supply system. But, for example, an external line extending from a conducting portion provided in the bearing portion 3 may be alternatively used.

Additionally, in the illustrated embodiment, the crank web 17 is provided on the upper end portion of the crankshaft 1 projecting upward from a bearing 5 so as to extend horizontally. But, the invention can also apply to a multi-cylinder engine by changing the upper portion of the oil path as shown in FIG. 1.

A crank pin 19, serving as a connecting portion, projects upward from one upper end face of the crank web 17. A connecting rod 20, serving as a connecting member with two pistons 40, 41 in two cylinders 42, 43, is connected to the crank pin 19 at the large end portion thereof.

A guide plate 21 is fixed to the upper end of the crank pin 19. The guide plate 21, extending nearly horizontally above the range from the crank pin 19 to the crankshaft 1, is provided with an oil catching recess 22 and an oil guide groove 23 at the lower face thereof. The recess 22 is positioned just above the outlet 16 so that the oil can jet from the outlet 16 toward the recess 22. The guide groove 23 extends from the recess 22 near to the periphery of the crank pin 19 so that the oil reaching to the recess 22 is led to the circumference of the crank pin 19 through the guide groove 23.

A nozzle cup 25 having an orifice 26 is mounted on the outlet 16 to jet the oil out of the outlet 16. The nozzle cup 25 is securely fitted into a cutout provided on the upper end face of the crank web 17.

The crankshaft 1 and the crank web 17 are provided with oil paths 28 and 29 in addition to the oil paths 13 and 14. The oil path 28 extends obliquely upward from the vicinity of the outlet 16 of the oil path 14 to an opening on the peripheral face of the crank pin 19 through the crankshaft 1, the crank web 17, and the crank pin 19. An oil path 44 opens onto the peripheral face of crank pin 19 to lubricate the connecting rod bearing for piston 41. The oil path 29 extends radially from the oil path 14 to the peripheral face portion of the crankshaft 1 being in contact with the bearing 5. The bearing 5 used in the illustrated embodiment is a bush bearing, therefore being required to be lubricated by using the oil path 29. But, the use as bearing 5 of a ball bearing eliminates the need for the oil path 29.

In FIGS. 2 and 3, an example of the oil pump 10 is shown. The oil pump 10, made of a molded plate material, is equipped with a fixing portion in the form of a cylindrical portion 30 securely fitted to the crankshaft 1, a flanged blade portion 31 projecting radially outwards from the upper end of the cylindrical portion 30. Such simple construction and simple fixing make the oil pump highly reliable. The blade portion 31 is divided into, for example, four circular parts by slits 32 arranged radially. The circular parts are each constructed so as to be bent obliquely downwards, for instance, over approximately half the peripheral range, whereby the oil is discharged downwards to the discharge port 12, shown in FIG. 1, due to the pump action of the bent portions when the blade 11 rotates together with the crankshaft 1.

The simple-construction and high-reliability oil pump as described above is desirably used. But, for the oil pump an integrally machined impeller etc. may be alternatively used. Additionally, a plurality of pumps can be provided, if necessary, to obtain a sufficient discharge pressure.

In the aforesaid construction, the blade 11 discharges the oil contained in the oil reservoir 8 to the discharge port 12 due to the rotation of the crankshaft 1. The oil flows from the discharge port 12 to the outlet 16 through the oil paths 13 and 14 and thereafter jets out from the orifice 26 toward the recess 22 on the guide plate 21. After reaching the recess 22, the oil passes through the guide groove 23 to the periphery of the crank pin 19 to lubricate the sliding face of the crank pin 19 with the connecting rod 20. On the other hand, a part of the oil is splashed around due to the centrifugal force before/after reaching the recess 22 to lubricate the inner circumferential face of a cylinder and a small end portion of the connecting rod 20, and the like. Moreover, a part of the oil in the oil path 14 flows into the oil path 29 to lubricate the sliding face of the crankshaft 1 with the bearing 5; a part of the oil flows through the oil path 28 to the periphery of the crank pin 19 to lubricate the sliding face of the crank pin 19 with the connecting rod 20.

As shown in the aforesaid embodiments, the oil supply paths 15 of various constructions may be provided in the crankshaft 1, thus in application of the invention to a practically used engine the oil supply path most suitable for the engine is selected.

Figure 5:
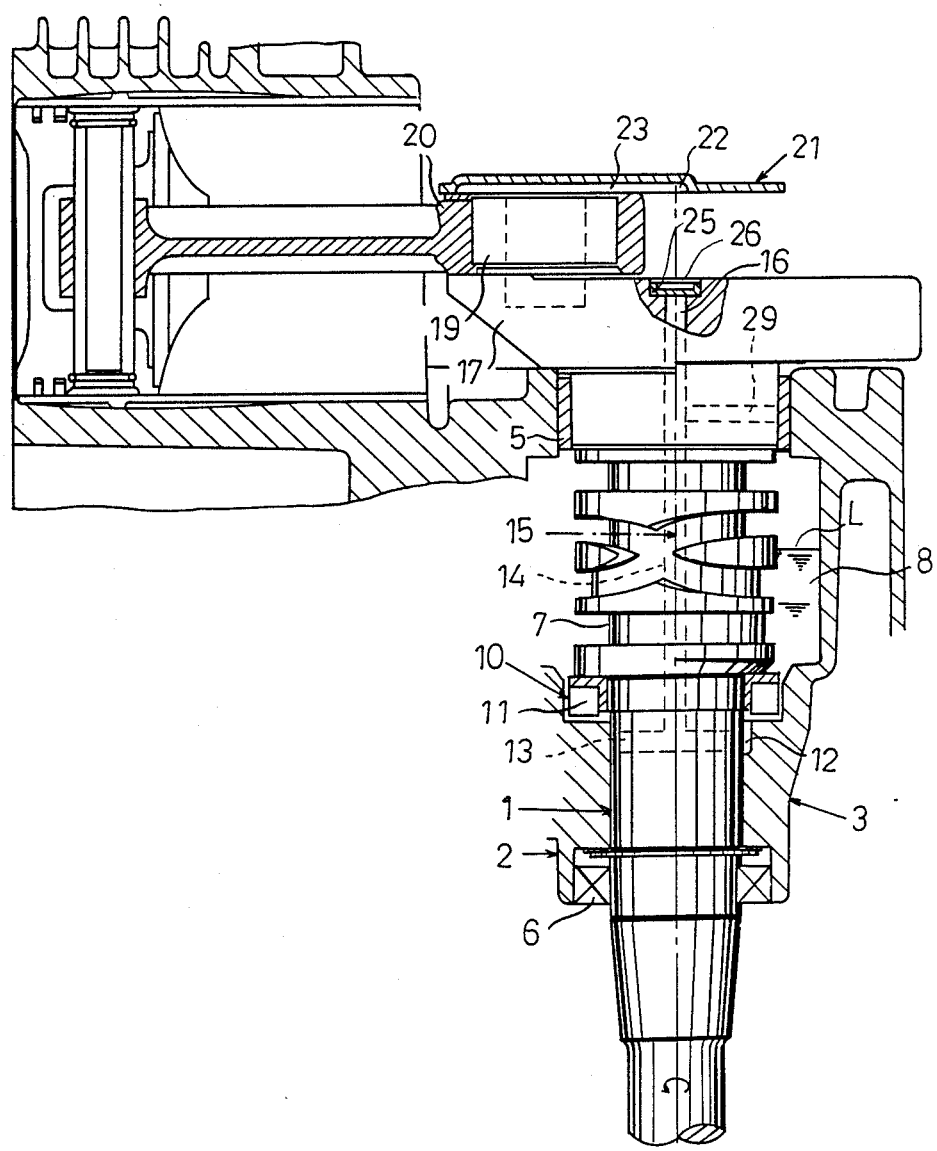
Figure 6:
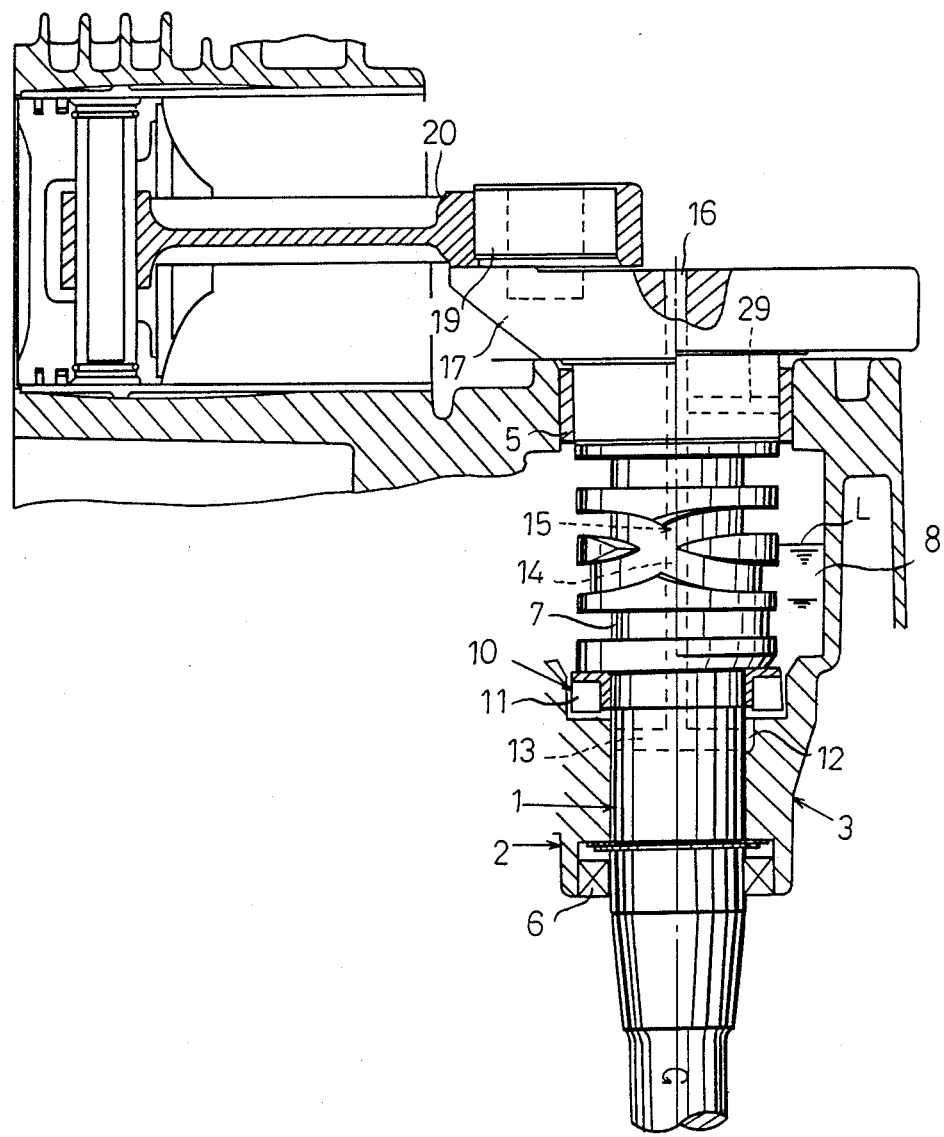

FIGS. 4–6 show other embodiments as examples of the oil supply path 15.

In the embodiment in FIG. 4, the guide plate 21 in the embodiment in FIG. 1 is eliminated, and the oil path 14 is closed (or opened) at the upper end thereof, thus only the oil paths 28 and 29 are provided.

In the embodiment in FIG. 5, the oil path 28 in FIG. 1 is eliminated.

In the embodiment in FIG. 6, the oil path 28, the guide plate 21, and the orifice 26 are eliminated, and the oil path 14 is opened at the upper end thereof without the orifice.

In the description of the aforesaid embodiments the invention was embodied in a side crank engine without a cam shaft capable of having a maximum effect according to the invention, but the invention may of course also apply to an engine equipped with a gear on the crankshaft 1 or a generally used engine with a cam shaft.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

1. A lubrication device for an engine having a crank case and a crank shaft, said crank shaft extending vertically in said crank case and having a lower portion thereof supported by a bearing in said crank case; said lubrication device comprising: an oil reservoir formed between said crank case and said crank shaft and including a lowest portion just above said bearing, a discharge port in the form of a relatively small void at said bearing, and a pumping member having a fixing portion fixed to a peripheral portion of said crank shaft for rotation therewith and located in said lowest portion just above said void, said pumping member having blade means for pressurizing oil in said reservoir into said void, said blade means depending downwardly from a horizontal plane defining a top member of the pump.

2. A lubrication device according to claim 1, wherein said fixing portion and said blade means are a unitary piece, said fixing portion being slipped onto said crankshaft, and said blade means comprising a plurality of blades bent at a predetermined angle axially of said crank shaft downwardly toward said void.

3. A lubrication device according to claim 2, comprising an oil supply path drilled in said crank shaft and connected to said void.

4. A lubrication device according to claim 3, wherein said crank shaft has a connecting portion for a connecting member to a piston at an upper end portion of said crank shaft, said bearing supporting said crank shaft only at a portion downwardly from said connecting portion, said oil supply path extending up to the upper end portion of said crank shaft.

5. A lubrication device according to claim 3, wherein said oil supply path consists of an oil path extending up to the upper end of said crank shaft and an additional oil path separating from said oil path and extending to said connecting portion of said crank shaft.

6. A lubrication device according to claim 4, wherein said oil supply path consists of an oil path extending up to the upper end portion of said crank shaft and an additional oil path separating from said oil path and extending to said connecting portion of said crank shaft.

* * * * *